July 8, 1969　　SHINICHI MINAMI ET AL　　3,454,473
METHOD FOR THE MANUFACTURE OF TITANIUM ANODIC OXIDATION FILM
CAPACITORS HAVING NON-ELECTROLYTICALLY PLATED CATHODE
Filed Dec. 4, 1964

Inventor
Shinichi Minami
Jun Ogawa
By Stevens Davis Miller & Mosher
ATTORNEYS

Header omitted 3,454,473
METHOD FOR THE MANUFACTURE OF TITANIUM ANODIC OXIDATION FILM CAPACITORS HAVING NON-ELECTROLYTICALLY PLATED CATHODE
Shinichi Minami, Osaka, and Jun Ogawa, Suita-shi, Japan, assignors to Matsushita Electric Industrial Co., Ltd., Osaka, Japan
Filed Dec. 4, 1964, Ser. No. 415,955
Claims priority, application Japan, Dec. 7, 1963, 38/66,612, 38/66,615
Int. Cl. H01g 1/00; C23b 9/00; C23c 3/00
U.S. Cl. 204—38                    2 Claims

ABSTRACT OF THE DISCLOSURE

A method for manufacturing a titanium anodized film capacitor having a non-electrolytically copper plated cathode, in which a metallic titanium element is subjected to anodic electrolysis in a solution containing fluoric acid and chromic acid, said element is anodically oxidized in the molten salt bath of sodium nitrate to produce a titanium anodized film on the surface of the titanium element, said element is successively immersed into a stannous chloride solution prepared with hydrochloric acid the concentration of which is less than 0.4 N and a palladium chloride solution made acidic by hydrochloric acid to activate said anodized film, said element just activated is immersed into a non-electrolytically copper plating solution for 6 to 9 minutes to have non-electrolytically copper plating on the titanium anodized film, and a lead cathode wire is fixed to the layer of thus plated copper.

---

The present invention relates to methods for the manufacture of titanium anodic oxidation film capacitors having non-electrolytically plated cathode and has for its primary object to provide extremely simple and readily practicable means for the manufacture of above-described titanium anodic oxidation film capacitors.

Recently, metals such as tantalum, aluminum, niobium and titanium which, when subjected to anodic oxidation treatment, form dielectric oxide films having a valve action have been widely used to manufacture solid type electrolytic capacitors. These electrolytic capacitors have featured large capacitance values in small sizes and at the same time have exhibited considerable improvements in their electrical characteristics. Solid type electrolytic capacitors, however, have such a structure that a metal having a valve action such as tantalum, aluminum, niobium or titanium is subjected to anodic oxidation in a suitable electrolyte to have an anodic oxidation film of dielectric nature formed on the metal surface, and the anodic oxidation films is then covered with a layer of semiconductive oxide such as manganese dioxide, cobalt oxide or lead oxide, the semiconductive oxide layer being further covered with a layer of conductive material such as colloidal carbon. However, with the recent progress in the method of manufacturing thin films of metal as by evaporation deposition or by spattering, new types of electrolytic capacitors have been developed which include an electrolytic capacitor in which a thin metal film having a valve action formed on an electrically insulating base plate by evaporation deposition or by spattering is subjected to anodic oxidation and an opposite electrode is provided on the anodic oxidation film by evaporation deposition, and an electrolytic capacitor in which, instead of the metal film formed by evaporation deposition or spattering in the above-described capacitor, a metal base having a valve action is employed and subjected to anodic oxidation and an opposite electrode is evaporation deposited on the anodically oxidized metal base. Both of these capacitors should be called anodic oxidation film capacitors. These new types of electrolytic capacitors have proved that the anodic oxidation film per se which has not hitherto been expected to have a substantial degree of withstand voltage property exhibits a sufficient withstand voltage characteristic in practical use. The anodic oxidation film capacitor thus obtained comprises a base metal having a valve action such as tantalum, aluminum, niobium or titanium, an anodic oxidation film obtained by subjecting the base metal to anodic oxidation, said anodic oxidation film being a dielectric, and an opposite electrode in the form of a thin metal film provided on the anodic oxidation film by evaporation deposition or by spattering. Since the anodic oxidation film capacitor does not include therein a semiconductor layer unlike the case with prior solid type electrolytic capacitors, the anodic oxidation film capacitor has its electrical characteristics far more excellent than those of prior solid type electrolytic capacitors. In order to obtain such anodic oxidation film capacitor by evaporation deposition or by spattering, a huge apparatus and considerably troublesome processes are required for the evaporation deposition or spattering of metal. Further, in view of the nature of the evaporation deposition or spattering process, the capacitor element must have an extremely simple shape such as a flat shape. Therefore it is impossible to form a thin metal film all over the entire surface of even an element of a relatively simple shape such as a spiral shape, to say nothing of a sintered body of spongy structure frequently employed in solid type electrolytic capacitors. For this reason, the small size and large capacitance value as is the case with prior solid type electrolytic capacitors can hardly be expected in the anodic oxidation film capacitor employing the process of evaporation deposition or spattering although it includes therein an anodic oxidation film which is an extremely thin dielectric layer on which a large capacitance can be expected.

The present invention eliminates complicated manufacturing steps of providing a semiconductive electrolyte in the prior solid type electrolytic capacitors and provides a novel method for the manufacture of a capacitor having a simplest structure of metal—dielectric—metal by extremely simple apparatus and means compared with prior anodic oxide film capacitors employing the process of evaporation deposition or spattering. Further, the present invention relates to a method for the manufacture of an anodic oxidation film capacitor with a large capacitance value in small size, by which even the surface of an element of complicated shape can sufficiently be covered with a thin metal film, the covering of which has been impossible according to the process of evaporation deposition or spattering. Thus, the problem of metal—dielectric—metal structure as well as the covering of the surface of an element of complicated shape can simultaneously be solved by the method according to the present invention, that is, the method of employing a non-electrolytically plated cathode.

According to the present invention, there is provided a method for the manufacture of a titanium anodic oxidation film capacitor having a non-electrolytically plated cathode comprising the steps of subjecting a metallic titanium element to anodic oxidation to cover the surface thereof with a titanium oxide film, and providing a layer of opposite electrode metal on said titanium oxide film by non-electrolytic plating.

There are other objects and particularities of the present invention which will become obvious from the following description with reference to the accompanying drawings, in which.

Figure 1:
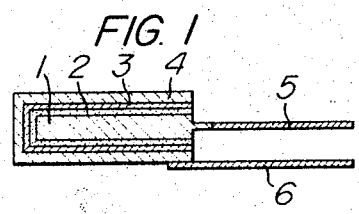
FIG. 1 is a schematic sectional view showing the structure of a titanium anodic oxidation film capacitor having a non-electrolytically plated cathode made according to the method embodying the present invention.
Figure 2:
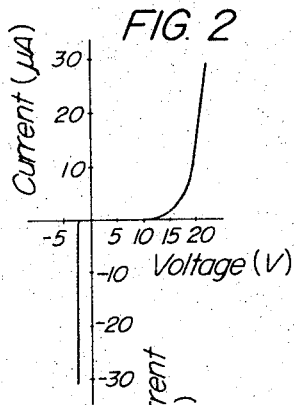
FIG. 2 is a graphic illustration of the voltage-current characteristic of the inventive capacitor.
Figure 3:
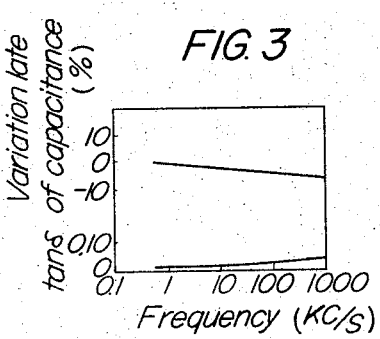
FIG. 3 is a graphic illustration of the frequency characteristic of the inventive capacitor.
Figure 4:
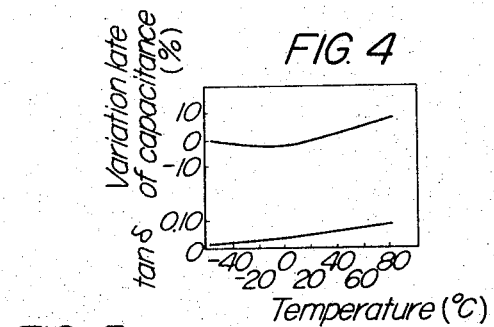
FIG. 4 is a graphic illustration of the temperature characteristic of the inventive capacitor.
Figure 5:
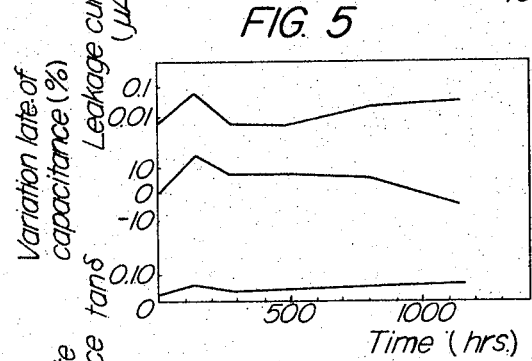
FIGS. 5 and 6 are graphic illustrations of results of loaded life tests on the inventive capacitor under various conditions.
Figure 6:
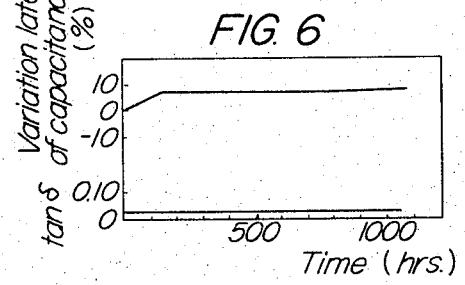

The method according to the present invention will now be described in detail with reference to FIG. 1. Particular attention has been given from long time ago to titanium metal, in view of the position which occupies in the periodic table, as a metal having a valve action, that is, a metal which forms an oxide film of dielectric nature when subjected to anodic oxidation, alike the metals such as aluminum, tantalum and niobium. However, it is difficult in the case of titanium to obtain an oxide film of excellently dielectric nature by a method of pretreatment or anodic oxidation such as is commonly employed for the metals such as aluminum, tantalum and niobium. Among methods of anodic oxidation suitable for titanium with such difficulty, there is a method of formation with molten salts. The salts preferred for this method include nitrates, nitrites, bisulfates, pyrosulfates and the likes. Cation of these salts may be any one of alkali metals, ammonium, etc. as far as it provides a suitable melting point. Suppose now sodium nitrate is employed as a salt for the formation. Sodium nitrate heated to melt is maintained at a temperature of from 305° to 310° C. and voltage is increased up to 60 volts with a plate of zirconium used as the cathode and titanium metal as the anode. Then, the voltage of 60 volts is maintained for 20 minutes and the formation is completed.

Generally, in the manufacture of electrolytic capacitors, the manner of treatment of metal elements prior to anodic oxidation is a quite important factor and this is especially so in the case of titanium. Titanium anodic oxidation film capacitors having non-electrolytically plated cathode are manufactured employing four different methods of pre-treatment to compare the effect of different pre-treatments on the characteristics of capacitors.

(1) Boiling in trichloroethylene for 10 minutes.
(2) Boiling in nitric acid for 10 minutes.
(3) Electrolytic cleansing in a bath mixture of hydrofluoric acid and chromic anhydride.
(4) Electrolytic cleansing in a bath mixture of hydrofluoric acid and chromic anhydride and subsequent boiling in nitric acid for 10 minutes.

Table 1 represents the comparative characteristics of the electrolytic capacitors thus obtained.

TABLE 1

| Pre-treatment | (1) | (2) | (3) | (4) |
|---|---|---|---|---|
| Leakage current (μA) under application of 10 volts | 43.3 | 14.20 | 0.10 | 1.10 |
| Capacitance (μF) measured at 120 c./s. | 0.00918 | 0.02008 | 0.00723 | 0.01136 |
| Tan δ measured at 120 c./s. | 0.024 | 0.024 | 0.027 | 0.020 |
| Percentage of shorting up to 10 volts | 40 | 0 | 0 | 0 |

As will be apparent from the results shown in Table 1, the most effective method of pretreatment for the manufacture of electrolytic capacitors by the anodic oxidation of titanium is the electrolytic cleansing in the hydrofluoric acid-chromic anhydride bath. The composition of the hydrofluoric acid-chromic anhydride bath used is such that 150 milliliters of hydrofluoric acid and 450 grams of chromic anhydride are dissolved into water to a total amount of 1 liter. The condition of electrolytic cleansing is such that electrolytic cleansing is continued for 3 minutes with a plate of carbon used as cathode and a titanium metal element 1 as anode while maintaining the current density at 250 milliamperes per square centimeters.

An anodic oxidation film 2 obtained by such pretreatment and subsequent anodic oxidation in a molten salt sufficiently stands practical use without any further treatment thereon, but still has weak points such as minute cracks. The greater portion of very little current which may remain as a leakage current during the anodic oxidation generally flows through such weak points. It is possible to selectively mend the weak points by the utilization of such current in the following manner. The titanium metal element having been subjected to anodic oxidation in a molten salt bath is soaked in a manganese sulfate solution made acidic by sulfuric acid and voltage is applied thereto with the titanium metal element 1 operating anodic. By this treatment, manganese dioxide selectively deposits on the weak points of the anodic oxidation film 2 to provide an increased withstand voltage property to the weak points. Any of the titanium metal element having been merely subjected to anodic oxidation in the molten salt bath and the titanium metal element having been subjected to the further treatment of manganese dioxide deposition in the manganese sulfate solution is further soaked in a suitable electrolyte to operate as an anode for the sake of additional mending of the anodic oxidation film 2 and voltage is applied thereto for a period ranging from several to less than twenty hours. The titanium metal element 1 having been subjected to the above treatment is then subjected to non-electrolytic plating to have the cathode 3 of the capacitor formed thereon.

The manner of forming the cathode by non-electrolytic plating will now be described in detail referring to a case of non-electrolytic plating of copper by way of an example.

The non-electrolytic plating consists of two treatments, that is, an activation treatment of preliminarily depositing reactive cores on the dielectric film 2 for providing ease of starting of the plating reaction and subsequent plating treatment. The first treatment or activation treatment usually comprises immersing the article to be plated in a stannous chloride solution made acidic by hydrochloric acid, and then immersing the article in a palladium chloride solution made acidic by hydrochloric acid to cause fine particles of metallic palladium to deposit on the surface of the article to be plated. Metallic palladium thus deposited acts as a catalyzer for the first plating reaction to cause the deposition of copper and thereafter the plating reaction proceeds with the deposited copper now acting as a catalyzer. The stannous chloride solution used in the activation treatment is made acidic by hydrochloric acid in order to avoid hydrolysis of stannous chloride, but the concentration of hydrochloric acid must carefully be selected since hydrochloric acid tends to give an adverse effect such as breakage of the anodic oxidation film of titanium 2. Table 2 below shows the relation between the concentration of hydrochloric acid in a 5% stannous chloride solution and the characteristics of titanium anodic oxidation film capacitors having non-electrolytically plated cathode.

TABLE 2

| Hydrochloric acid concentration (N) | 0.1 | 0.2 | 0.4 | 0.8 |
|---|---|---|---|---|
| Leakage current (μA) under application of 10 volts | 0.87 | 0.85 | 0.98 | 9 |
| Capacitance (μF) measured at 120 c./s. | 0.3914 | 0.3555 | 0.3827 | 0.3728 |
| Tan δ measured at 120 c./s. | 0.047 | 0.051 | 0.044 | 0.047 |
| Percentage of shorting up to 10 volts | 40 | 40 | 20 | 80 |

From the above Table 2, it will be known that the concentration of hydrochloric acid may desirably be less than 0.4 N at which hydrolysis of stannous chloride is difficult to take place.

On the other hand, as for the concentration of stannous chloride, the stannous chloride solution with concentration of the order of 0.01% has a sufficient ability to activate, and in this case a hydrochloric acid concentration of 0.05 N will be sufficient. In other words, a satisfactory result can be obtained with a stannous chloride solution in which the hydrochloric acid concentration is less than 0.4 N and stannous chloride concentration is less than 5%. Uniform plating can not be effected if the anodic oxidation film of titanium is difficulty wetted by the aqueous solution of stannous chloride made acidic by hydrochloric acid. In such a case, a non-aqueous solvent, for example, methanol, ethanol or acetone may preferably be used. In the case of such non-aqueous solution, its ability to activate is reduced in a relatively short time. In order to prevent reduction of the activating ability, it is recommended that dilute hydrochloric acid is added to the non-aqueous solution. By the addition of dilute hydrochloric acid, the activating ability continues effective for a long time.

As for the palladium chloride solution made acidic by hydrochloric acid, the solution including a hydrochloric acid concentration of 0.012 N and a palladium chloride concentration of the order of 100 p.p.m. is suitable for the activation. The titanium element having been activated by the palladium chloride solution may be subjected to the subsequent non-electrolytic plating either in a state as wetted with water or in a dried state.

A prefered bath composition for the non-electrolytic plating of copper may be prepared by successively dissolving 0.75 gram of copper nitrate, 1.5 grams of Rochelle salt, 1 gram of caustic sode in about 80 cc. of water, then adding 5 cc. of formalin, and subsequently adding water to obtain a total amount of 100 cc. In the plating operation, the plating solutioin is maintained at a temperature of 23° to 24° C. and the article to be plated after having been subjected to the above-described activation treatment is immersed in the plating solution for a period of from 6 to 9 minutes for obtaining a sufficiently plated copper layer 3. Then, a cathode lead 6 may directly be affixed to the copper layer or cathode layer 3 of the article having been plated or a layer 4 of conductive coating may be provided on the plated cathode layer 3 in order to provide a complete conductivity and then such cathode lead 6 may be affixed thereto. FIGS. 2 to 6 show the electrical characteristics of the titanium anodic oxidation film capacitor having the non-electrolytically plated cathode manufactured according to the method of the present invention. It will be seen that the electrolytic capacitor of the present invention is especially excellent in its frequency characteristic in respect of capacitance and tan δ

From the foregoing description, it will be understood that the specific advantages of the titanium anodic oxidation film capacitor having the non-electrolytically plated cathode made according to the method of the present invention are that the cathode metal layer can extremely easily be formed by an apparatus which is far simpler than that used in the prior method of evaporation deposition or spattering and can be formed on an anode of far more complicated shape than is possible by the prior method of evaporation deposition or spattering. The capacitor made according to the method of the present invention has extremely excellent electrical characteristics similar to anodic oxide film capacitors made by the prior method of evaporation deposition or spattering.

What is claimed is:

1. A method for manufacturing a titanium anodized film capacitor having a non-electrolytically copper plated cathode comprising the steps of subjecting a metallic titanium element to anodic electrolysis in a solution containing fluoric acid and chromic acid, anodically oxidizing said titanium element in a molten salt bath of sodium nitrate to produce a titanium anodized film on the surface of the titanium element, successively immersing said element into a stannous chloride solution prepared with hydrochloric acid the concentration of which is less 0.4 N and a palladium chloride solution made acidic by hydrochloric acid to activate said titanium anodized film, immersing said titanium element just activated into a non-electrolytically copper plating solution to non-electrolytically plate copper onto the titanium anodized film, and fixing a lead cathode wire to the layer of thus plated copper.

2. A method for manufacturing a titanium anodized film capacitor having a non-electrolytically copper plated cathode according to claim 1, wherein said stannous chloride solution is a non-aqueous solution of stannous chloride acidified with dilute hydrochloric acid.

References Cited

UNITED STATES PATENTS

| 2,631,115 | 3/1953  | Fox      | 136—138  |
| 2,829,091 | 4/1958  | Missel   | 204—32   |
| 2,873,233 | 2/1959  | Schnable | 204—32   |
| 2,946,728 | 7/1960  | Foisel et al. | 204—37 |
| 2,965,551 | 12/1960 | Richaud  | 204—32   |
| 2,995,473 | 8/1961  | Levi     | 106—1 XR |
| 3,214,292 | 10/1965 | Edson    | 106—1 XR |
| 3,234,031 | 2/1966  | Zirngiebl | 106—1   |
| 3,246,994 | 4/1966  | Ritchie  | 106—1    |
| 3,305,460 | 2/1967  | Lacy     | 204—20   |

FOREIGN PATENTS

| 563,590 | 9/1958 | Canada. |

OTHER REFERENCES

Saubestre, "Electroless Plating Today" Metal Finishing, July 1962, pp. 49–53.

JOHN H. MACK, *Primary Examiner.*

W. B. VANSISE, *Assistant Examiner.*

U.S. Cl. X.R.

29—590; 117—200; 204—32